(12) United States Patent
King et al.

(10) Patent No.: US 8,430,793 B2
(45) Date of Patent: Apr. 30, 2013

(54) APPARATUS, SYSTEM, AND METHOD FOR IMPROVING THE RATE OF DECELERATION OF AN ENGINE

(75) Inventors: Brian J. King, Columbus, IN (US); Greg A. Moore, Columbus, IN (US); Amy S. Sinkhorn, Seymour, IN (US)

(73) Assignee: Cummins, Inc., Columbus, IN (US)

( * ) Notice: Subject to any disclaimer, the term of this patent is extended or adjusted under 35 U.S.C. 154(b) by 1744 days.

(21) Appl. No.: 11/280,945

(22) Filed: Nov. 16, 2005

(65) Prior Publication Data
US 2007/0111853 A1 May 17, 2007

(51) Int. Cl.
*F16H 47/08* (2006.01)
*F16H 47/10* (2006.01)

(52) U.S. Cl.
USPC .............................................. 477/109; 477/33

(58) Field of Classification Search .............. 477/32, 477/33, 100, 104, 107, 109; 123/323; 60/602; 701/110
See application file for complete search history.

(56) References Cited

U.S. PATENT DOCUMENTS

| | | | | |
|---|---|---|---|---|
| 4,680,988 A | * | 7/1987 | Mori | 477/65 |
| 5,778,329 A | * | 7/1998 | Officer et al. | 701/55 |
| 5,921,883 A | | 7/1999 | Bellinger | 477/33 |
| 6,233,934 B1 | * | 5/2001 | Church et al. | 60/602 |
| 6,325,743 B1 | | 12/2001 | Genise et al. | 477/124 |
| 6,349,253 B1 | | 2/2002 | Bellinger | 701/53 |
| 6,409,629 B1 | | 6/2002 | Davis | 477/98 |
| 6,461,273 B1 | | 10/2002 | Davis et al. | 477/98 |
| 6,543,226 B1 | * | 4/2003 | Bischoff et al. | 60/602 |
| 6,663,535 B2 | | 12/2003 | Holloway | 477/110 |
| 6,692,406 B2 | | 2/2004 | Beaty | 477/32 |
| 6,855,090 B2 | * | 2/2005 | Tabata et al. | 477/107 |
| 7,048,671 B2 | * | 5/2006 | Morisawa et al. | 477/109 |
| 7,214,163 B2 | * | 5/2007 | Jeon | 477/109 |

FOREIGN PATENT DOCUMENTS

JP 359050259 A * 3/1984

* cited by examiner

*Primary Examiner* — Roger Pang
(74) *Attorney, Agent, or Firm* — Kunzler Law Group, PC

(57) ABSTRACT

An apparatus, system, and method are disclosed for improving the rate of deceleration of an engine. The apparatus may include an engine control module configured to communicate with a transmission control module, and an engine speed control module configured to increase the rate of deceleration of an engine. The system includes the apparatus and a vehicle having a turbocharged internal combustion engine coupled to an automated manual transmission. The method includes requesting a target engine speed during a shift event, monitoring engine operating parameters, and increasing the rate of deceleration of an engine.

27 Claims, 7 Drawing Sheets

US 8,430,793 B2

APPARATUS, SYSTEM, AND METHOD FOR IMPROVING THE RATE OF DECELERATION OF AN ENGINE

BACKGROUND OF THE INVENTION

1. Field of the Invention

This invention relates to shift events of automotive transmissions and more particularly relates to improving the rate of deceleration of an engine to improve shift quality of automated manual transmissions.

2. Description of the Related Art

The purpose of an automotive transmission is to allow an engine to operate within a narrow range of speeds while outputting a broad range of speeds. Without a transmission, a vehicle would be limited to using one gear ratio. Vehicles need transmissions to take advantage of the narrow rpm ranges of the engine where horsepower and torque are at a maximum. The transmission allows the gear ratio between the engine and the drive wheels to change as the vehicle speeds up and slows down. Shifting gears allows the engine to stay near the rpm range that will provide the best performance.

At least three different types of transmissions have been developed over the past century to enable the engine to operate in a broad range of speeds. The first, the manual transmission, generally includes an output shaft driven by the engine, a layshaft, and a drive shaft that drives the wheels of the vehicle. Each shaft has at least one sprocket or gear that meshes with the gears of the other shafts. A gear selector moves a collar to engage the gears of the drive shaft. In many situations the manual transmission is ideal, such as a sports car. However, heavy duty trucks often require 10 or more gears, and shifting through each of those gears to get the heavy duty truck up to speed requires skill and can be tiresome.

The second type of transmission is the automatic transmission. The automatic transmission, as the name suggests, automatically shifts between gears. The key difference between a manual and an automatic transmission is that the manual transmission locks and unlocks different sets of gears to the output shaft to achieve the various gear ratios, while in an automatic transmission, a planetary gearset produces all of the different gear ratios. Automatic transmissions greatly reduce the skill required to operate vehicles, and also improve the perceived "smoothness" of a vehicle by reducing rough shift events of inexperienced drivers. However, automatic transmissions are not able to transfer the large amounts of torque produced by the engines of heavy duty trucks.

The third type of transmission is an automated manual transmission. The automated manual transmission attempts to blend the ability of the manual transmission to handle large amounts of torque with the automatic transmission's ease of use. Automated manual transmissions include the traditional manual gearboxes, but also electronic controls and actuators that make all decisions of when to shift, as well as actually performing the shift. Shift maneuvers are performed when a transmission control module issues commands via an electronic datalink to an engine control module.

The automated manual transmission generally transitions smoothly from one gear to another. Overall vehicle acceleration performance is impacted by the total time spent at zero torque, or in other terms, out of gear. This is particularly important when accelerating on a steep grade. During the shift event, the vehicle is decelerating. This has the effect of moving the target synchronization speed down during the shift. The target synchronization speed is the ideal engine speed at which to shift from neutral into the next gear. For example, while the initial target engine speed may have been 1400 revolutions per minute (RPM) when the transmission first started the shift event, the time spent at zero engine torque causes the vehicle to slow and thereby cause the target synchronization speed to drop.

In certain situations the engine cannot decelerate quickly enough to "catch up" with the moving sychronization target before that target drops below the engine speed where, once back in gear, the engine could effectively accelerate the truck. In other words, by the time the engine reaches the target speed and allows the transmission to go into gear, the engine speed is too low to accelerate the truck in that gear. Such an event causes a rough shift event, noticeable drive shaft ringing or vibrations, and causes undue wear on the engine and transmission.

To improve this situation, some automated manual transmissions will request engine brakes to increase the rate of deceleration of the engine. This has the effect of reducing the time it takes to reach the target synchronization speed and allows the engine to "catch" the target at a speed at which the engine will have enough torque to accelerate the vehicle once the transmission goes into gear. However, the use of engine brakes brings about new performance challenges.

Engine brakes require a few hundred milliseconds to activate. Therefore, even when engine brakes are requested, the engine initially decelerates at the natural rate, and subsequently extremely fast once the engine brakes have activated. The use of engine brakes can cause a rate of deceleration of about 2500 RPM per second. The combination of this extreme deceleration rate and engine brake hydromechanical deactivation delays make it difficult for the engine governor to catch the engine at the target synchronization speed and often cause the engine to "overshoot" the target synchronization speed. This results in rough shift events and undesired driveline component abuse.

From the foregoing discussion, it should be apparent that a need exists for an apparatus, system, and method that improve the rate of deceleration of an engine. Beneficially, such an apparatus, system, and method would improve the rate of deceleration of the engine without the use of engine brakes, and if engine brakes are required by the transmission control module, only utilize a portion of the engine brakes.

SUMMARY OF THE INVENTION

The present invention has been developed in response to the present state of the art, and in particular, in response to the problems and needs in the art that have not yet been fully solved by currently available transmissions. Accordingly, the present invention has been developed to provide an apparatus, system, and method for improving the rate of deceleration of an engine that overcomes many or all of the above-discussed shortcomings in the art.

The apparatus is provided with a plurality of modules configured to functionally execute the necessary steps of improving the rate of deceleration of the engine. These modules in the described embodiments include an engine control module configured to communicate with a transmission control module. The transmission control module is configured to receive a target engine speed during a shift event. The engine control module is configured to monitor engine operating parameters. The apparatus may also include an engine speed control module configured to increase a rate of deceleration of the engine.

In one embodiment, the engine speed control module is configured to increase the rate of deceleration of the engine by adjusting exhaust gas flow through a variable geometry turbocharger. Alternatively, the engine speed control module maybe configured to increase the natural deceleration rate of the engine by operatively engaging at least one engine brake. In one embodiment, the engine speed control is further configured to increase the rate of deceleration of the engine by using a combination of exhaust gas flow restriction and engine brakes. In a further embodiment, the engine speed control module is further configured to monitor engine speed and decrease engine backpressure upon reaching the target engine speed.

A system of the present invention is also presented to improve the rate of deceleration of the engine. In particular, the system, in one embodiment, includes a vehicle having a turbocharged internal combustion engine coupled to an automated manual transmission, an engine control module configured to communicate with a transmission control module, the transmission control module configured to request a target engine speed during a shift event, and an engine speed control module configured to increase backpressure on the turbocharged internal combustion engine and increase a rate of deceleration of the engine.

A method of the present invention is also presented for improving the rate of deceleration of the engine. The method in the disclosed embodiments substantially includes the steps necessary to carry out the functions presented above with respect to the operation of the described apparatus and system. In one embodiment, the method includes requesting a target engine speed during a shift event, monitoring engine operating parameters, and increasing backpressure on an engine to increase a rate of deceleration of the engine.

The method may also include adjusting exhaust gas flow through a variable geometry turbocharger, and/or operatively engaging at least one engine brake. In one embodiment, the method includes monitoring engine speed and decreasing engine backpressure upon reaching a target engine speed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
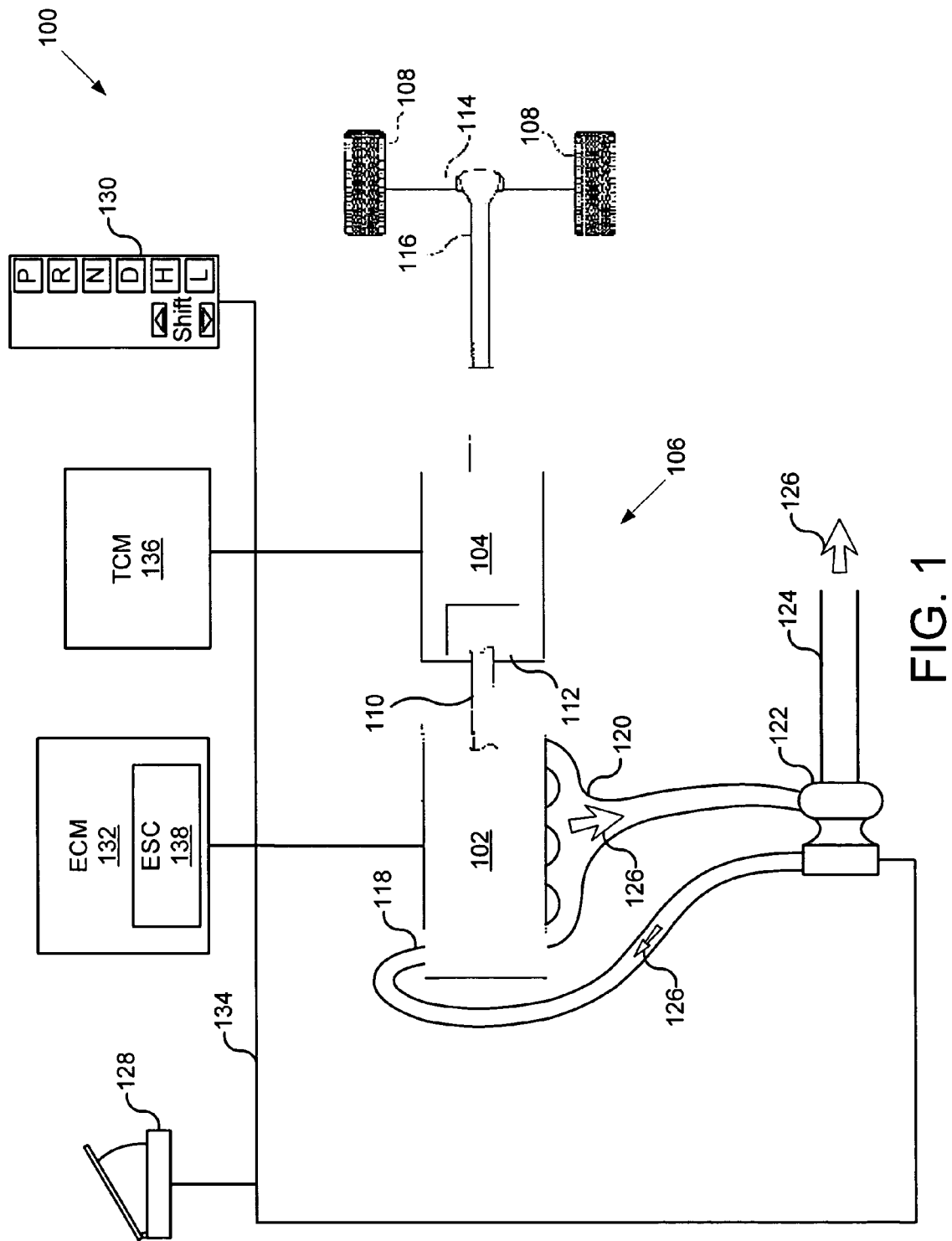
FIG. 1 is a schematic block diagram illustrating one embodiment of a system for improving the rate of deceleration of an engine.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a system for improving the natural deceleration rate of an engine. In one embodiment, the system comprises a vehicle 100. The vehicle 100 may be an automobile, truck, bus, or other type of internal combustion powered vehicle. The vehicle 100 may comprise an internal combustion engine 102 coupled to a transmission 104. The internal combustion engine 102 (hereinafter "engine 102") may be of the four stroke diesel-fueled type with Compression Ignition (CI). Alternatively, the engine 102 may be a different type of engine such as, but not limited to, two stroke diesel-fueled types, a Spark Ignition (SI) type of engine, or a gaseous or gasoline fueled type. The engine 102 together with the transmission 104 is commonly referred to as a "drivetrain."

In one embodiment, the drivetrain 106 further comprises a pair of rotating propulsion members in the form of ground engaging wheels 108. An output shaft 110 of the engine 102 couples the engine 102 to a torque converter 112 of the transmission 104. The transmission 104, in a further embodiment, may comprise an automated manual transmission. The term "automated manual transmission" may refer to a manual transmission having a clutch and an electronic automated control system, allowing the transmission 104 to do the clutching and shifting. Alternatively, the transmission may comprise a manual or automatic transmission.

A propeller shaft 114 is rotatably coupled to a drive shaft 116 of the transmission 104 and transfers torque from the engine 102 to the wheels 108 in order to propel the vehicle. The present description of the drivetrain 106 is directed to the primary components of the drivetrain 106 with standard components not being specifically described as the standard components would be known to those skilled in the art.

The engine 102, in one embodiment, includes an intake manifold 118, an exhaust manifold 120, a turbocharger 122, and an exhaust system 124. Exhaust and combustion gasses generally flow in the directions indicated by arrows 126. As is well known to those skilled in the art, exhaust gasses are exhausted from the engine 112 into the exhaust manifold 120, and pushed through the turbocharger 122 to the exhaust system 124. The turbocharger 122 utilizes the flow of exhaust gasses to accelerate the flow of combustion gasses through the intake manifold 118 to subsequently increase the performance of the engine 112. The operation of the turbocharger 122 will be discussed in greater detail below with reference to FIGS. 2 and 3.

A driver utilizes a throttle 128, a gear selection module 130, and a plurality of input devices (not shown), such as a steering wheel, while driving the vehicle 100. In one embodiment, an engine control module (ECM) 132 is configured to receive control data from the plurality of input devices, throttle 128, and gear selection module 130. The ECM 132 may also be configured to interpret the data and send command signals to the engine 132. One skilled in the art will recognize that the ECM 132 is also capable of commanding a plurality of systems, such as a fueling system.

In one embodiment, the ECM 132 is configured to communicate over a data network 134 with a transmission control module (TCM) 136. The data network 134 may be a common data path over which the throttle 128 and gear selection module 130 transmit commands. Additionally, the data network 134 may comprise wired or wireless connections between the plurality of devices 128, 130, 132, and 136. Alternatively, each device 128, 130, 132, 136 may include a separate connection to each of the other devices.

Although, in one embodiment, the transmission 104 comprises an automated manual transmission, the gear selection module 130 may comprise a gear selection device that appears to the driver to operate in a manner similar to an automatic transmission. A benefit of the present invention is to provide a smooth shift event similar to that of an automatic transmission while utilizing an automated manual transmission along with the high torque levels the automated manual transmission can handle.

In a further embodiment, the ECM 132 comprises an engine speed control (ESC) module 138. The ESC module 138 maybe configured to increase backpressure on the engine 102 and subsequently increase the rate of deceleration of the engine. In one embodiment, the ESC module 138 increases the rate of deceleration of the engine by engaging an exhaust gas flow restricting device. In one embodiment, the turbocharger 122 may be configured to restrict exhaust gas flow. Such a turbocharger will be discussed below in greater detail with reference to FIGS. 2 and 3.

In a further embodiment, the ESC module 138 may restrict exhaust gas flow by at least partially engaging an exhaust brake, or other type of exhaust restricting device. Alternatively, or in addition, the ESC module 138 maybe configured to increase the rate of deceleration of the engine by engaging one or more engine brakes. Engine brakes will be discussed in greater detail below with reference to FIG. 6.

Figure 2:
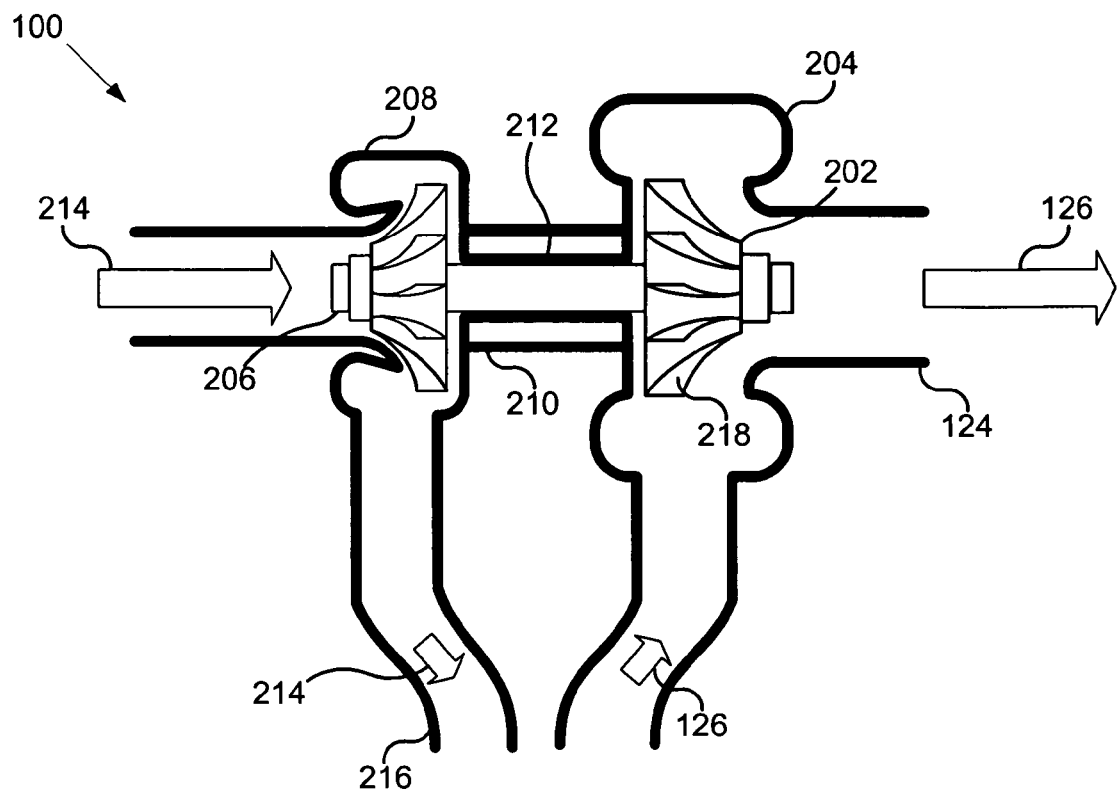
FIG. 2 is a schematic block diagram illustrating one embodiment of a turbocharger in accordance with the present invention.

FIG. 2 is a schematic block diagram illustrating one embodiment of a turbocharger 200 in accordance with the present invention. The turbocharger 200, in one embodiment, may comprise a variable geometry turbocharger (VGT). Current turbochargers 200 generally comprise two main components; a turbine wheel 202 and the collector or turbine housing 204. Exhaust gas is directed (indicated by arrow 206) into the housing 204 from an exhaust port. The exhaust gas turns the turbine wheel 202 and subsequently leaves the housing 204 and travels through the exhaust system 124. The speed of the engine 102 determines how fast the turbine wheel 202 turns because as the exhaust gas flow from the engine increases, the speed of the turbine wheel 202 likewise increases.

The turbocharger 200 also includes a compressor. The compressor comprises an impeller 206 or compressor wheel, and a compressor housing 208. A bearing housing 210 couples the compressor housing 208 to the turbine housing 204. A shaft 212 connects the impeller 206 to the turbine wheel 202. As the turbine wheel 202 spins, air is drawn in (indicated by arrow 214) and compressed. The compressor housing 208 is configured to convert a high velocity, low pressure air stream into a high pressure, low velocity air stream. This process of converting the air to a high pressure, low velocity stream causes the temperature of the air to increase dramatically. Subsequent cooling of this air is called intercooling or aftercooling, and is well known to those skilled in the art.

Turbochargers 200 may employ different strategies to vary the swallowing capacity of the turbine housing 204. The swallowing capacity is the volume of air that may be passed through the turbine housing 204. By varying the swallowing capacity of the turbocharger 200, the turbine power may be set to provide sufficient energy to drive the impeller 206 at the desired boost level at any engine speed. One strategy to accomplish this is to vary the area of the guide vanes 218 that control the flow of exhaust gas through the turbo housing 204.

Figure 3:
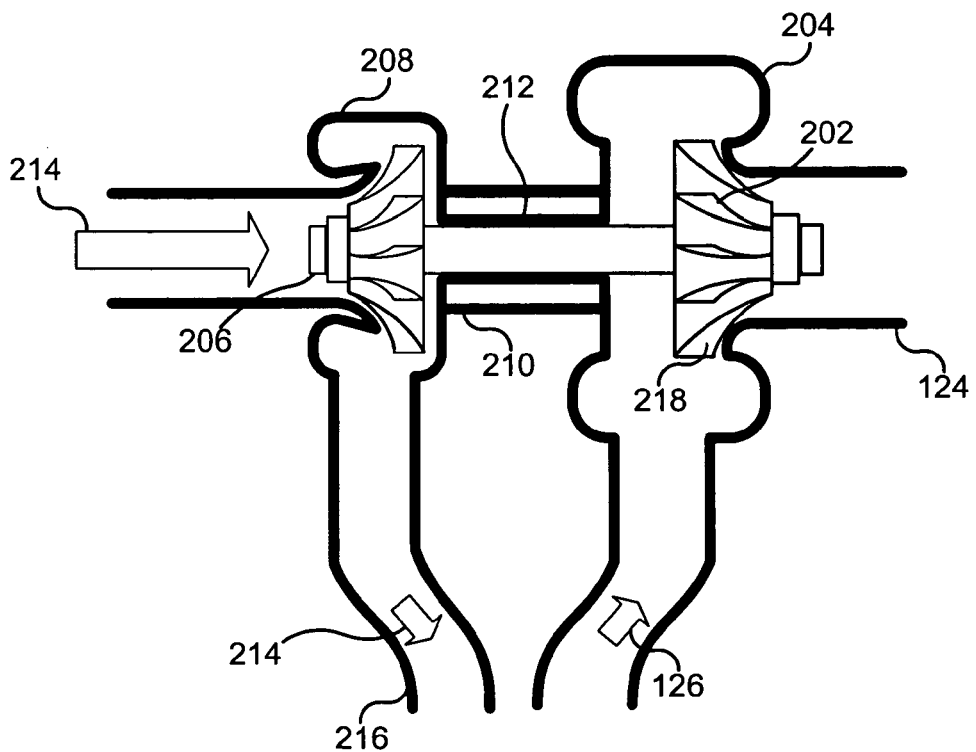
FIG. 3 is a schematic block diagram illustrating one embodiment of a variable geometry turbocharger in accordance with the present invention.

FIG. 3 is a schematic block diagram illustrating one embodiment of a variable geometry turbocharger 300 in accordance with the present invention. In one embodiment, the area of the guide vanes 218 is reduced by sliding axially the turbine wheel 202 towards the turbine housing 204 to effectively reduce the area through which exhaust gas may flow. Alternative strategies are employed to accomplish the task of reducing the area, including, but not limited to, variable guide vanes 218, and wastegates (not shown).

Although not specifically mentioned, there exist many strategies for maintaining a desired boost level throughout a range of engine speeds. These same strategies maybe employed by the ESC module 138 in order to increase the rate of deceleration of the engine 102. Examples of these strategies include, but are not limited to, multi-stage turbochargers, exhaust gas recirculation, and turbo compound systems.

Figure 4:
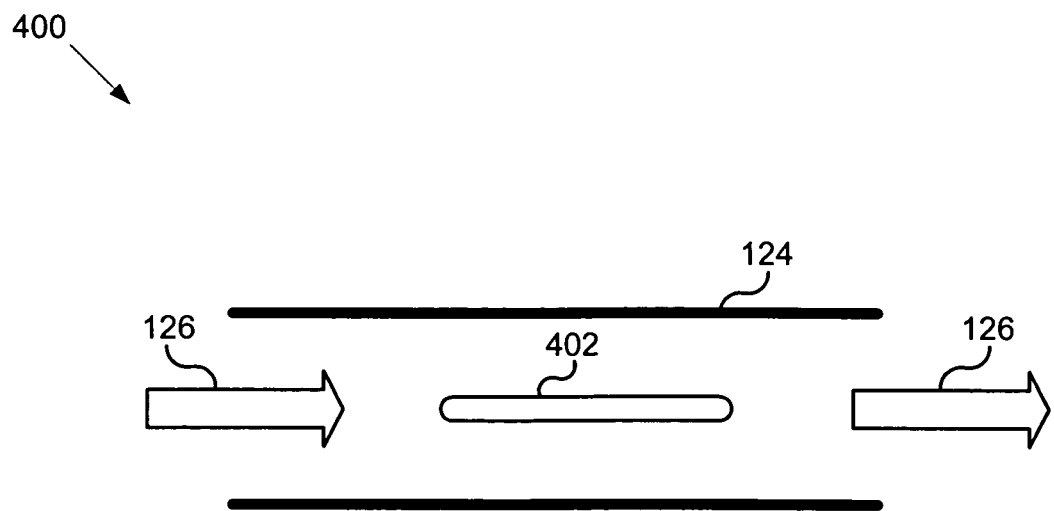
FIG. 4 is a schematic block diagram illustrating one embodiment of an exhaust brake system in accordance with the present invention.

FIG. 4 is a schematic block diagram illustrating one embodiment of an exhaust brake system 400 in accordance with the present invention. In one embodiment, the exhaust brake system 400 includes a gate 402. The gate 402 is generally placed downstream from the turbocharger 122, and configured to pivot in order to restrict exhaust gas flow and increase exhaust gas backpressure on the engine 102. Increasing the exhaust gas backpressure on the engine 102 reduces engine speed and subsequently vehicle 100 speed.

Figure 5:
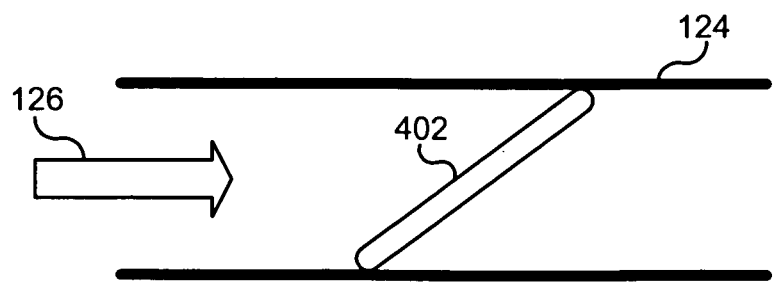
FIG. 5 is schematic block diagram illustrating one embodiment of the exhaust brake system in accordance with the present invention.

FIG. 5 is schematic block diagram illustrating one embodiment of the exhaust brake system 400 in accordance with the present invention. In the depicted embodiment, the gate 402 may be configured to pivot in order to partially or fully restrict exhaust gas flow in response to a command from the ESC module 138. Many of the functional units of the exhaust brake system 400 have been omitted, such as the electronics and the motor that pivots the gate 402, for clarity.

Figure 6:
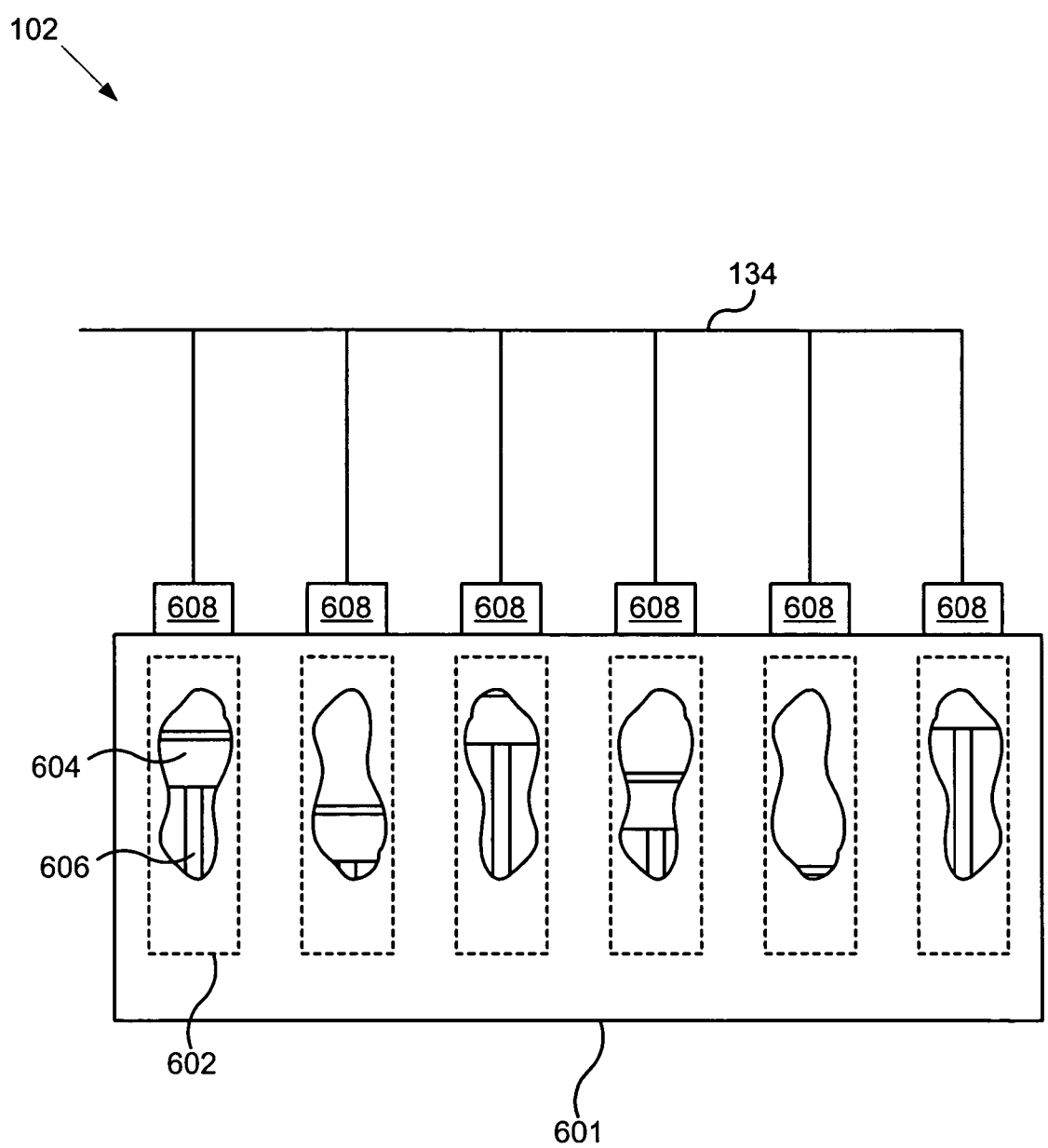
FIG. 6 is a schematic block diagram illustrating one embodiment of the engine 102 in accordance with the present invention.

FIG. 6 is a schematic block diagram illustrating one embodiment of the engine 102 in accordance with the present invention. The engine 102 may include an engine block 601 having a plurality of cylinders 602. Located within each cylinder is a piston 604 coupled to a piston rod 606. Above each cylinder 602, and coupled to the engine block 601 is an engine brake 608. Each engine brake 608 is configured to at least partially open an exhaust valve on the engine 102 when the piston 604 is near top dead center. On the upstroke, the piston 604 compresses the air in the cylinder 602. This compression creates a large drag force on the engine 102 during the upstroke. The engine brake 608 may then release the compressed air, and subsequently the energy stored in the compressed air. Releasing the compressed air prevents any fuel in the cylinder from igniting. In other terms, the upstroke consumes a great amount of energy which is then released, and an energy generating combustion is prevented because the air fuel mixture is released by the engine brake 608.

The ESC module 138 may be configured to selectively engage all or less than all of the engine brakes 608 in order to increase the rate of deceleration of the engine 102. The ESC module 138 is configured to monitor the rate of deceleration of the engine 102 during a shift event and may command one or more engine brakes 608 to engage in response to the rate of deceleration.

Figure 7:
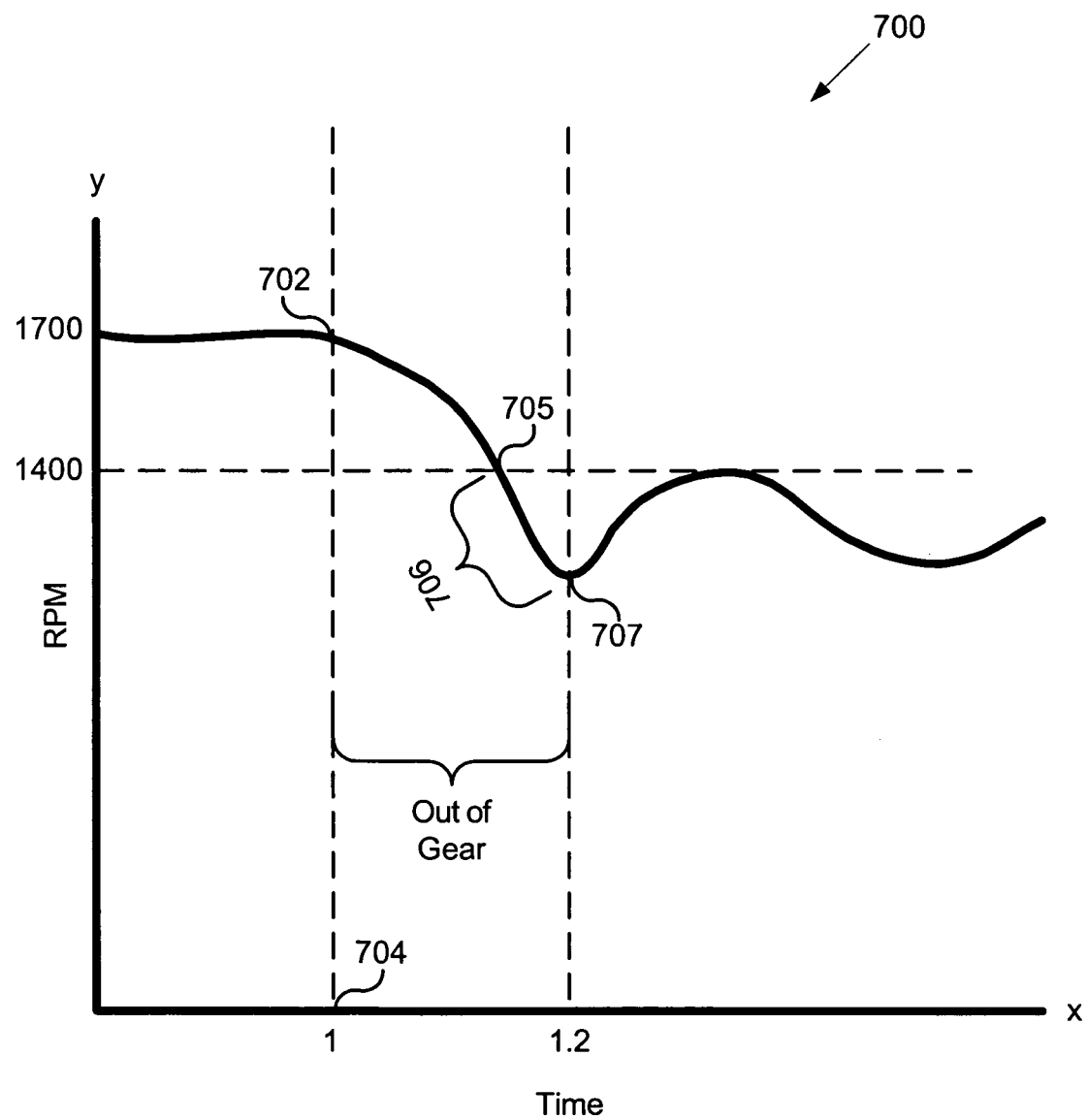
FIG. 7 is a schematic graph diagram illustrating an engine speed curve in accordance with the prior art.

FIG. 7 is a schematic graph diagram illustrating an engine speed curve 700 in accordance with the prior art. Engine speed, in revolutions per minute, is shown along the ordinate (y axis), and time, in seconds, is shown along the abscissa (x axis). The time interval, as depicted, is given herein by way of example and for clarity only, and is not intended to specifically describe every shift event that may occur during operation of the vehicle 100.

As described above with reference to FIG. 1, the ECM 132 and the TCM 136 constantly exchange information regarding engine 102 operating parameters. In one embodiment, this exchange of information occurs about every 20 milliseconds. The TCM 136 is configured to detect when the vehicle 100 would benefit from a gear change, and subsequently request the gear change. In the depicted embodiment, the initial engine speed 702 may be 1700 RPMs. At a time index 704 of one second, the TCM 136 may command the ECM 132 to ramp engine torque to zero and command a target engine speed 705 of 1400 RPMs. The ECM 132 complies and the reduction in engine speed is shown in the decline of the engine speed curve 700.

The TCM 136, in one embodiment, may require the use of engine brakes 608 if the rate of deceleration of the engine 102 is not sufficient. Unfortunately, the use of engine brakes 608 to aid in the rate of deceleration may have a negative effect. For instance, the time required to engage engine brakes 608 is significant compared to the total time of the shift event. Additionally, the use of engine brakes increases the rate of deceleration of the engine 102 to a level that is too high for a smooth shift event. For example, during a shift event where the TCM 136 has required engine brakes, the rate of deceleration may be 2500 RPMs per second. By the time the engine brakes 602 have engaged, the target speed has been reached, and the engine brakes 602 have been disengaged, the engine speed has "shot past" the target speed.

In the depicted embodiment, a portion 706 of the engine speed curve 700 represents an overshoot of the engine speed. The TCM 136 regardless shifts 707 the transmission 104 into gear at an engine speed that is not ideal. A "rough" shift event occurs because of the overshoot, and subsequently, the vehicle 100 experiences drive shaft 116 ringing or rattle. Such drive shaft 116 ringing is the result of unnecessary stress on the transmission 104.

Figure 8:
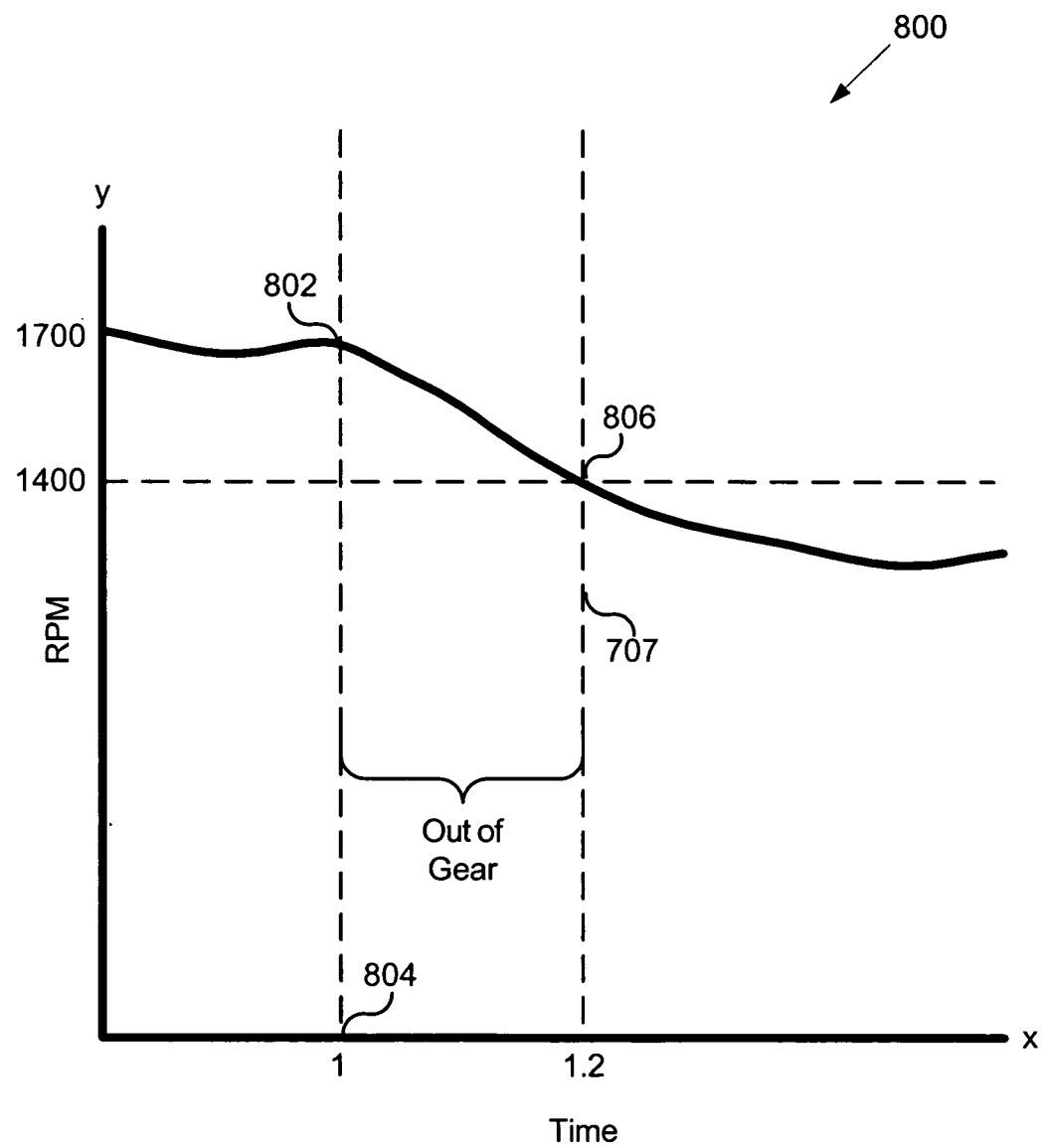
FIG. 8 is a schematic graph diagram illustrating one embodiment of an engine speed curve in accordance with the present invention.

FIG. 8 is a schematic graph diagram illustrating one embodiment of an engine speed curve 800 in accordance with the present invention. Engine speed, in revolutions per minute, is shown along the ordinate (y axis), and time, in seconds, is shown along the abscissa (x axis). The time interval, as depicted, is given herein by way of example and for clarity only, and is not intended to specifically describe every shift event that may occur during operation of the vehicle 100.

In one embodiment, the ECM 132 having an ESC module 138, unlike an ECM 132 of the prior art, is configured to monitor the engine speed of the engine 102 and anticipate when the TCM 136 is going to initiate a shift event. In one example, the initial engine speed 802 of the engine 102 may be 1700 RPMs. The TCM 136, at a time index 804 of one second, may command the ECM 132 to ramp engine torque to zero and command a target engine speed 806 of 1400 RPMs. The ECM 132 complies, and the reduction in engine speed is shown in the decline of the engine speed curve 700. However, unlike the engine speed curve 700 of the prior art, the ESC module 138 restricts the flow of exhaust gas and causes a more controlled decline in the engine speed. This gradual decline is nearly linear, and allows the TCM 136 to smoothly shift into the next gear.

Upon reaching the target engine speed 806, the ESC 138 removes the restriction of the exhaust gasses, and the TCM 136 commands the ECM 132 to resume engine torque, or engine fueling.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
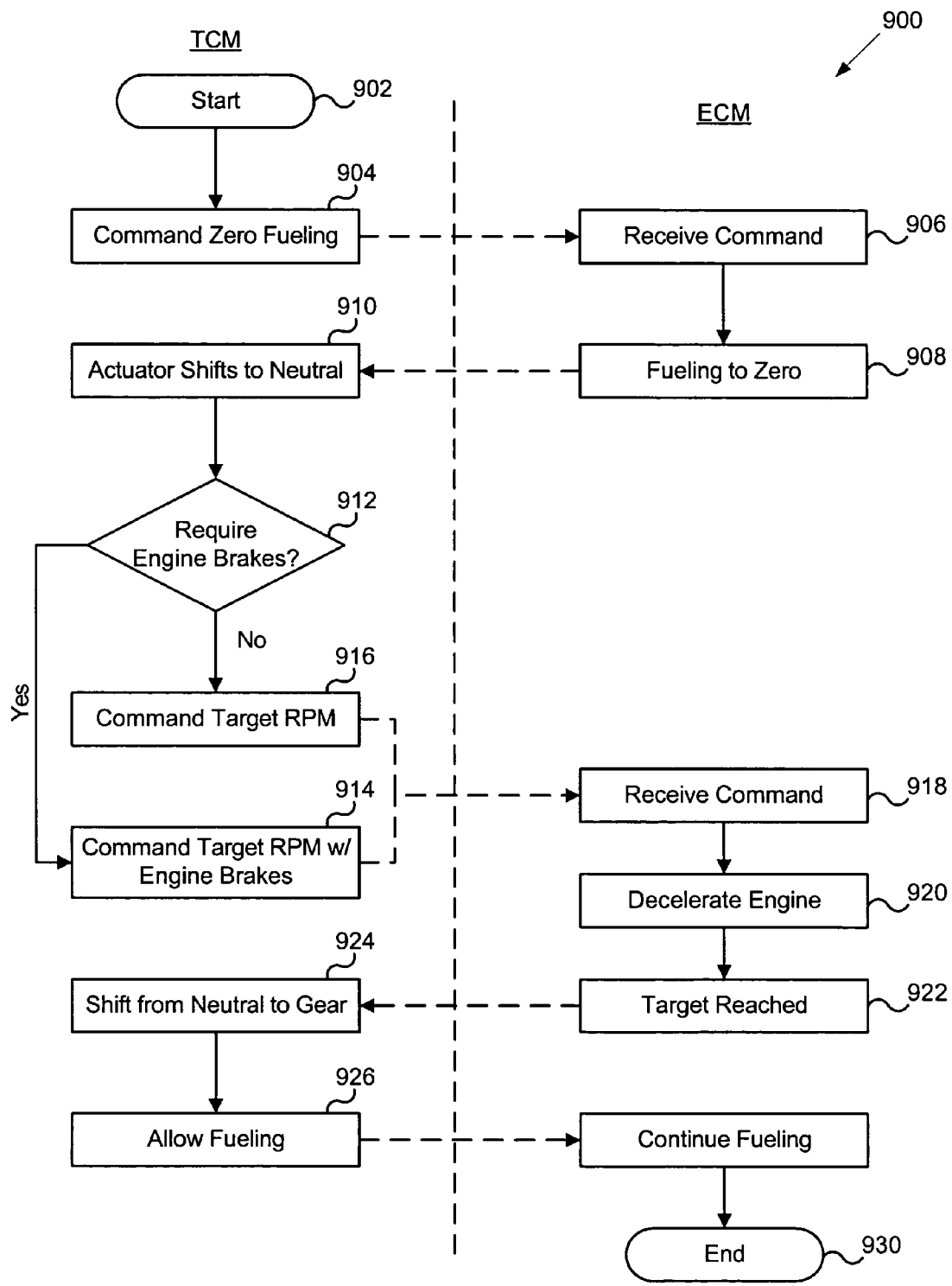
FIG. 9 is a schematic flow chart diagram illustrating one embodiment of a method for improving the rate of deceleration of an engine in accordance with the present invention.

FIG. 9 is a schematic flow chart diagram illustrating one embodiment of a method 900 for improving the rate of deceleration of an engine in accordance with the present invention. In one embodiment, the method 900 starts 902 and the TCM 136 commands 904 the ECM 132 to ramp down to zero fueling, or zero torque. The ECM 132 receives 906 the command and ramps 908 engine fueling down. The TCM 136 may then cause the transmission 104 to shift 910 to a neutral state or gear.

In certain embodiments, the TCM 136 may require 912 the use of engine brakes 62 during a shift event. If the TCM 136 requires 912 engine brakes 602 then the TCM 136 sends 914 a command specifying a target RPM and specifying the use of engine brakes 602. However, if engine brakes 602 are not required 912, the TCM 136 will simply send 916 a command specifying a target RPM. Target fuel and torque levels may be included in the command.

In a further embodiment, the ECM 132 receives 918 the command and determines whether or not engine brakes were requested. The ECM 132, in one embodiment, must comply with the engine brake request even if the ECM 132 determines that the target RPM may be reached through other methods. The ESC module 138 module then engages at least one engine brake 602, while monitoring the engine speed. Any combination or number of the existing engine brakes 602 may be utilized for increasing the rate of deceleration of the engine 102. In one example, an engine 102 having six cylinders is commanded by the ESC module 138 to engage three of the engine brakes 602.

Engaging only a portion of the total available engine brakes 602 has many benefits. First, the maximum rate of deceleration is not as great as with the total available engine brakes 602. For example, engaging six engine brakes 602 may result in a rate of deceleration of 2500 RPM per second. Due to the delay of engaging and disengaging the engine brakes, such a high rate of deceleration will cause the engine speed to "overshoot" the target engine speed and result in a harsh shift event. Second, because only a portion of the cylinders have the engine brakes engaged, the other portion may be utilized for providing torque to the transmission 104 earlier in the shift event.

Alternatively, or in addition, the ESC module 138 my increase the rate of deceleration by restricting the flow of exhaust thereby increasing backpressure on the engine 102. In one embodiment, increasing 920 the rate of deceleration comprises restricting the flow of exhaust gasses through a turbocharger such as, but not limited to, the variable geometry turbocharger 122 of FIG. 2. Alternatively, or in addition, increasing 920 the rate of deceleration of the engine 102 may comprise applying an exhaust brake, such as the exhaust brake 400 of FIG. 4, or applying a combination of engine brakes, exhaust brake, and restricting the flow of exhaust gasses through the turbocharger. The ESC module 138 continuously monitors the engine speed and once the target engine speed is reached 922, the ESC module 138 opens the flow of exhaust gasses. The TCM 136 shifts 924 from the neutral state or gear into a selected gear, and allows 926 the ECM 132 to continue 928 fueling and subsequently ramp up the torque. The method 900 then ends 930.

In a further embodiment, the ESC module 138 may monitor and modify a combination of parameters including exhaust gas flow restriction, partial or full engine brake engagement, retarded fuel injection timing and rate, retarded fuel injection pressure, turbocharger waste, retarded intake air, and retarded engine valve timing and activation states in order to increase or improve the rate of deceleration of the engine 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to decrease the total time of a shift event of a transmission, the apparatus comprising:
an engine control module configured to communicate with a transmission control module and receive a target engine speed during a shift event;
the engine control module configured to monitor and modify engine operating parameters; and
an engine speed control module configured to increase the rate of deceleration of an engine by increasing exhaust backpressure, wherein the exhaust backpressure is increased for an amount of time necessary to reduce the speed of the engine to the target engine speed.

2. The apparatus of claim 1, wherein the engine speed control module increases exhaust backpressure by adjusting exhaust gas flow through a variable geometry turbocharger.

3. The apparatus of claim 1, wherein the engine comprises a plurality of combustion chambers, each combustion chamber having an engine brake.

4. The apparatus of claim 3, wherein the engine speed control module is further configured to increase the rate of deceleration of the engine by operatively engaging at least one engine brake.

5. The apparatus of claim 4, wherein the engine speed control module is further configured to operatively engage in the range of between about 10 and 50 percent of available engine brakes in response to the transmission control module requesting engine brakes.

6. The apparatus of claim 1, wherein the engine operating parameters are selected from a group consisting of fuel injection timing, fuel injection rate, fuel injection pressure, turbocharger waste gate control, intake air throttle setting, variable geometry turbo vane position setting, engine valve timing setting, engine valve activation state, and revolutions per minute of a crankshaft.

7. The apparatus of claim 1, wherein the engine speed control module is further configured to decrease engine backpressure upon reaching the target engine speed.

8. The apparatus of claim 1, wherein the engine speed control module is configured to increase the rate of deceleration of the engine by engaging at least one engine brake and simultaneously increasing backpressure on the engine.

9. The apparatus of claim 1, wherein the engine speed control module is configured to increase the rate of deceleration of the engine in order to complete a shift event without the transmission control module requesting the use of engine brakes.

10. A system to decrease the total time of a shift event of a transmission, the system comprising:
  a vehicle having a turbocharged internal combustion engine coupled to an automated manual transmission;
  an engine control module configured to communicate with a transmission control module and receive a target engine speed during a shift event;
  the engine control module configured to monitor and modify engine operating parameters; and
  an engine speed control module configured to increase the rate of deceleration of an engine by increasing exhaust backpressure, wherein the increased rate of deceleration due to the increased exhaust backpressure prevents the engine from overshooting the target engine speed.

11. The system of claim 10, wherein the engine speed control module is further configured to increase backpressure on the engine by adjusting exhaust gas flow through a variable geometry turbocharger.

12. The system of claim 10, wherein the engine comprises a plurality of combustion chambers, each combustion chamber having an engine brake.

13. The system of claim 12, wherein the engine speed control module is further configured to increase the deceleration rate of the engine by operatively engaging at least one engine brake.

14. The system of claim 13, wherein the engine speed control module is further configured to operatively engage in the range of between about 10 and 50 percent of available engine brakes in response to the transmission control module requesting engine brakes.

15. The system of claim 10, wherein the engine operating parameters are selected from a group consisting of fuel injection timing, fuel injection rate, fuel injection pressure, turbocharger waste gate control, intake air throttle setting, variable geometry turbo vane position setting, engine valve timing setting, engine valve activation state, and revolutions per minute of a crankshaft.

16. The system of claim 10, wherein the engine speed control module is further configured to monitor engine speed and decrease engine backpressure upon reaching the target engine speed.

17. A computer readable medium tangibly embodying a program of machine-readable instructions executable by a digital processing apparatus to perform an operation to decrease the total time of a shift event of a transmission, the operation comprising:
  receiving a target engine speed during a shift event;
  monitoring and modifying engine operating parameters; and
  increasing the rate of deceleration of an engine by increasing exhaust backpressure; and
  maintaining the increased exhaust backpressure until a speed of the engine reaches the target engine speed.

18. The computer readable medium of claim 17, wherein the instructions further comprise an operation to increase the rate of deceleration of an engine by adjusting exhaust gas flow through a variable geometry turbocharger.

19. The signal bearing medium of claim 17, wherein the instructions further comprise an operation to operatively engage at least one engine brake.

20. The signal bearing medium of claim 17, wherein the instructions further comprise an operation to operatively engage in the range of between about 10 and 50 percent of available engine brakes in response to a transmission control module requesting engine brakes.

21. The computer readable medium of claim 17, wherein the instructions further comprise an operation to monitor engine speed and decrease engine backpressure upon reaching a target engine speed.

22. A method for to decreasing the total time of a shift event of a transmission, the method comprising:
  receiving a target engine speed during a shift event;
  monitoring and modifying engine operating parameters;
  increasing the rate of deceleration of an engine by increasing exhaust backpressure; and
  maintaining the increased exhaust backpressure until a speed of the engine reaches the target engine speed.

23. The method of claim 22, wherein the method comprises increasing backpressure on the engine by adjusting exhaust gas flow through a variable geometry turbocharger.

24. The method of claim 22, wherein the method comprises engaging at least one engine brake.

25. The method of claim 22, wherein the method comprises engaging in the range of between about 10 and 50 percent of available engine brakes in response to a transmission control module requesting engine brakes.

26. The method of claim 22, wherein the method comprises monitoring engine speed and decreasing engine backpressure upon reaching a target engine speed.

27. An apparatus to decrease the total time of a shift event of a transmission, the apparatus comprising:
  means for receiving a target engine speed during a shift event;
  means for monitoring and modifying engine operating parameters; and
  means for increasing a rate of deceleration of the engine by increasing engine back pressure until a speed of the engine reaches the target engine speed.

* * * * *